United States Patent
Choi et al.

(10) Patent No.: US 8,161,108 B2
(45) Date of Patent: Apr. 17, 2012

(54) INTEGRATING PARTICIPANT PROFILE INFORMATION INTO REAL-TIME COLLABORATIONS

(75) Inventors: Christopher Y. Choi, Southport (AU); Christopher J. Hockings, Burleigh Waters (AU); Neil I. Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 12/348,694

(22) Filed: Jan. 5, 2009

(65) Prior Publication Data

US 2010/0174780 A1 Jul. 8, 2010

(51) Int. Cl.
G06F 15/16 (2006.01)

(52) U.S. Cl. ....................................................... 709/204
(58) Field of Classification Search ................... 709/204
See application file for complete search history.

(56) References Cited

U.S. PATENT DOCUMENTS

| | | | |
|---|---|---|---|
| 5,164,897 A * | 11/1992 | Clark et al. | 705/321 |
| 5,854,893 A | 12/1998 | Ludwig et al. | |
| 7,219,107 B2 | 5/2007 | Beringer | |
| 7,321,886 B2 | 1/2008 | Swaminathan et al. | |
| 7,606,909 B1 * | 10/2009 | Ely et al. | 709/227 |
| 7,773,740 B2 * | 8/2010 | Beckstrom et al. | 379/265.13 |
| 2002/0144273 A1 * | 10/2002 | Reto | 725/86 |
| 2003/0078821 A1 | 4/2003 | Gorur et al. | |
| 2004/0002885 A1 * | 1/2004 | Levy | 705/8 |
| 2004/0148347 A1 * | 7/2004 | Appelman et al. | 709/204 |
| 2006/0005144 A1 | 1/2006 | Salomon | |
| 2006/0067250 A1 * | 3/2006 | Boyer et al. | 370/260 |
| 2007/0004389 A1 | 1/2007 | Wallace et al. | |
| 2007/0005698 A1 * | 1/2007 | Kumar et al. | 709/204 |

OTHER PUBLICATIONS

Maybury, Mark. Expert Finding System. The MITRE Corporation. 2006. pp. 1-49.*
ECLIPSE, "Higgins Open Source Identity Framework", www.eclipse.org/higgins 2008.
IBM, "Lotus Sametime Unyte", www.unyte 2008.

* cited by examiner

Primary Examiner — John MacIlwinen
(74) Attorney, Agent, or Firm — DeLizio Gillam, PLLC

(57) ABSTRACT

An online collaboration system can access data in one or more skills repositories to search for participants with indicated skills and automatically display participants' skill information during online collaborations. Searching for participants by skill allows individuals most likely to add value to a discussion to be identified and invited to an online collaboration. Displaying skill information can facilitate focused interaction leading to a more productive online collaboration.

17 Claims, 6 Drawing Sheets

INTEGRATING PARTICIPANT PROFILE INFORMATION INTO REAL-TIME COLLABORATIONS

BACKGROUND

Embodiments of the inventive subject matter generally relate to the field of conferencing systems, and, more particularly, to integrating participant profile information into real-time collaborations.

Conferencing systems, such as WebEx® and GoToMeeting®, connect users in different geographic locations to real-time meetings and collaborations over the Internet. Meeting participants communicate via voice and/or text chat, and in some cases, using video conferencing. A moderator can share his or her desktop so that all participants are able to view a presentation or other files simultaneously. Some conferencing systems use voice recognition to indicate which participant is currently speaking.

SUMMARY

Embodiments include a method directed to detecting a request to find potential participants for an online collaboration based on indicated skills. One or more skills repositories are searched for potential participants that have the indicated skills, wherein the search yields a plurality of potential participants. One or more participants are determined from the plurality of potential participants. The one or more participants are invited to participate in the online collaboration.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to conferencing systems, embodiments may be implemented in instant messaging applications. In other instances, well-known instruction instances, protocols, structures and techniques have not been shown in detail in order not to obfuscate the description.

Online collaborations are often used to resolve issues or problems that arise in business. Online collaborations may be less effective if participants are unfamiliar with each other because participants are from different geographic locations or have not met prior to joining the online collaboration. When participants are unaware of each other's skills and expertise, they may have trouble addressing questions to a knowledgeable participant, or may be influenced to follow a less than ideal solution because of dominance by a less knowledgeable participant. In addition, invitations may be distributed superfluously without consideration to participants' skill sets. Individuals may join an online collaboration without clear understanding as to why they were invited. An online collaboration system can access data in one or more skills repositories to search for participants with indicated skills and automatically display participants' skill information during online collaborations. Searching for participants by skill allows individuals most likely to add value to a discussion to be identified and invited to an online collaboration. Displaying skill information can facilitate focused interaction leading to a more productive online collaboration.

Figure 1:
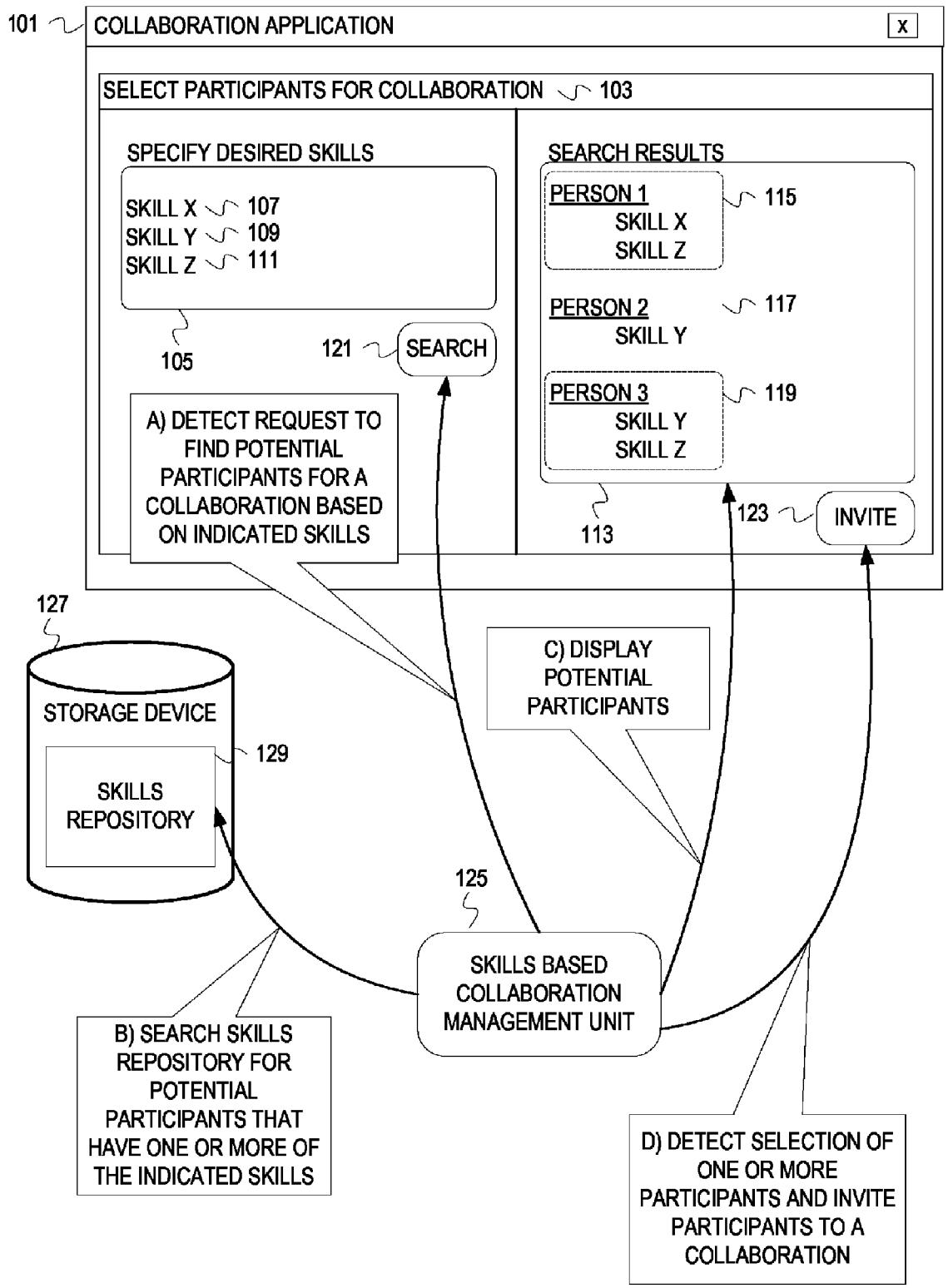
FIG. 1 is an example conceptual diagram of searching for potential participants for an online collaboration based on indicated skills.

FIG. 1 is an example conceptual diagram of searching for potential participants for an online collaboration based on indicated skills. A select participants for collaboration window 103 is active in a collaboration application 101. The select participants for collaboration window 103 comprises a specify desired skills input area 105, a search button 121, a search results display area 113 and an invite button 123.

At stage A, a skills based collaboration management unit 125 detects a request to find potential participants for an online collaboration based on indicated skills. In this example, the skills based collaboration management unit 125 detects a click on the search button 121. Skill X 107, skill Y 109 and skill Z 111 have been indicated in the specify desired skills input area 105. In this example the specify desired skills input area 105 comprises a text box, the specify desired skills input area may comprise one or more of a text box, a check box, a list, etc.

At stage B, the skills based collaboration management unit 125 searches a skills repository 129 for potential participants that have one or more of the indicated skills. In this example, one skills repository 129 is depicted. In other examples, more than one skills repository may be searched. The skills repository 129 is hosted on a storage device 127. The storage device 127 may be located on a server running the collaboration application 101, a remote server (e.g., a company server), etc.

At stage C, the skills based collaboration management unit 125 displays potential participants in the search results display area 113. In this example, the potential participants comprise person 1 115, person 2 117 and person 3 119. Person 1 115 possesses skill X and skill Y. Person 2 possesses skill Y. Person 3 possesses skill Y and skill Z.

At stage D, the skills based collaboration management unit 125 detects selection of one or more participants and invites the one or more participants to the online collaboration. In this example, the skills based collaboration management unit 125 detects that person 1 115 and person 3 119 are selected when the invite button 123 is clicked. An invitation is sent to person 1 115 and person 3 119. The invitation may be an e-mail, a short message service (SMS) text message, etc.

Figure 2:
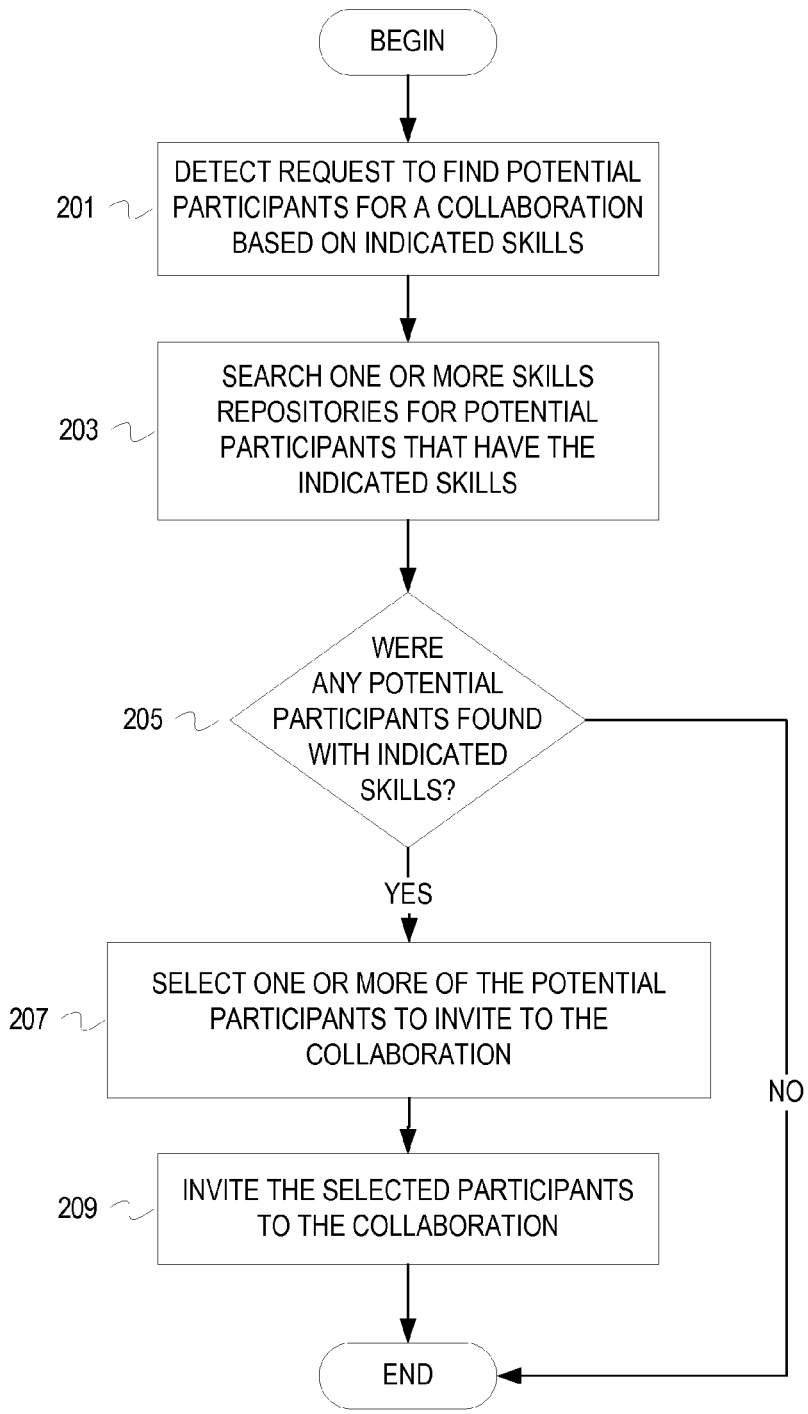
FIG. 2 is a flowchart depicting example operations for searching for participants for an online collaboration based on indicated skills and automatically inviting one or more participants to the online collaboration.

In the above example, invitations to participate in an online collaboration were sent after participants were selected by a user from a plurality of potential participants. FIG. 2 is a flowchart depicting example operations for searching for participants for an online collaboration based on indicated skills and automatically inviting one or more participants to the online collaboration. Flow begins at block 201, where a request to find potential participants for an online collaboration based on indicated sills is detected. For example, a moderator selects four skills from a list and clicks a find button.

At block 203, one or more skills repositories are searched for potential participants that have the indicated skills. Examples of skills repositories include IBM® Bluepages, SEE-K®, etc. More than one skills repository may be searched because potential participants may work for different companies, at different company sites, etc. The skills repositories may or may not be of the same type (e.g., different database structures) and may or may not be stored on the same storage device.

At block 205, it is determined if any potential participants were found with the indicated skills. An individual is included in a plurality of potential participants if the individual possesses one or more of the indicated skills. If one or more potential participants were found, flow continues at block 207. If no potential participants were found, flow ends.

At block 207, one or more of the potential participants are selected to invite to the online collaboration. The selection of the one or more potential participants is automatic based on a set of preferences. Preferences may include minimum skill levels for participants, a number of indicated skills possessed by a participant, a maximum number of participants, etc. For example, preferences may indicate that invitations automatically be sent to a maximum of five participants who have at least intermediate skill levels, to all of the potential participants who have at least x of y indicated desired skills, etc.

At block 209, the one or more selected participants are invited to the online collaboration. For example, an email is sent to the participants. The email contains a date, time and topic of the meeting.

In addition, invitations may be sent out both automatically and manually. For example, a moderator desires to conduct a meeting to solve a production problem for a customer. The moderator indicates several skills and searches a company skills database. The moderator wishes to invite two employees of the customer, but the skills database does not contain skills information for the two employees. The moderator manually sends invitations to the two employees of the customer, and requests information about their skills.

Figure 3:
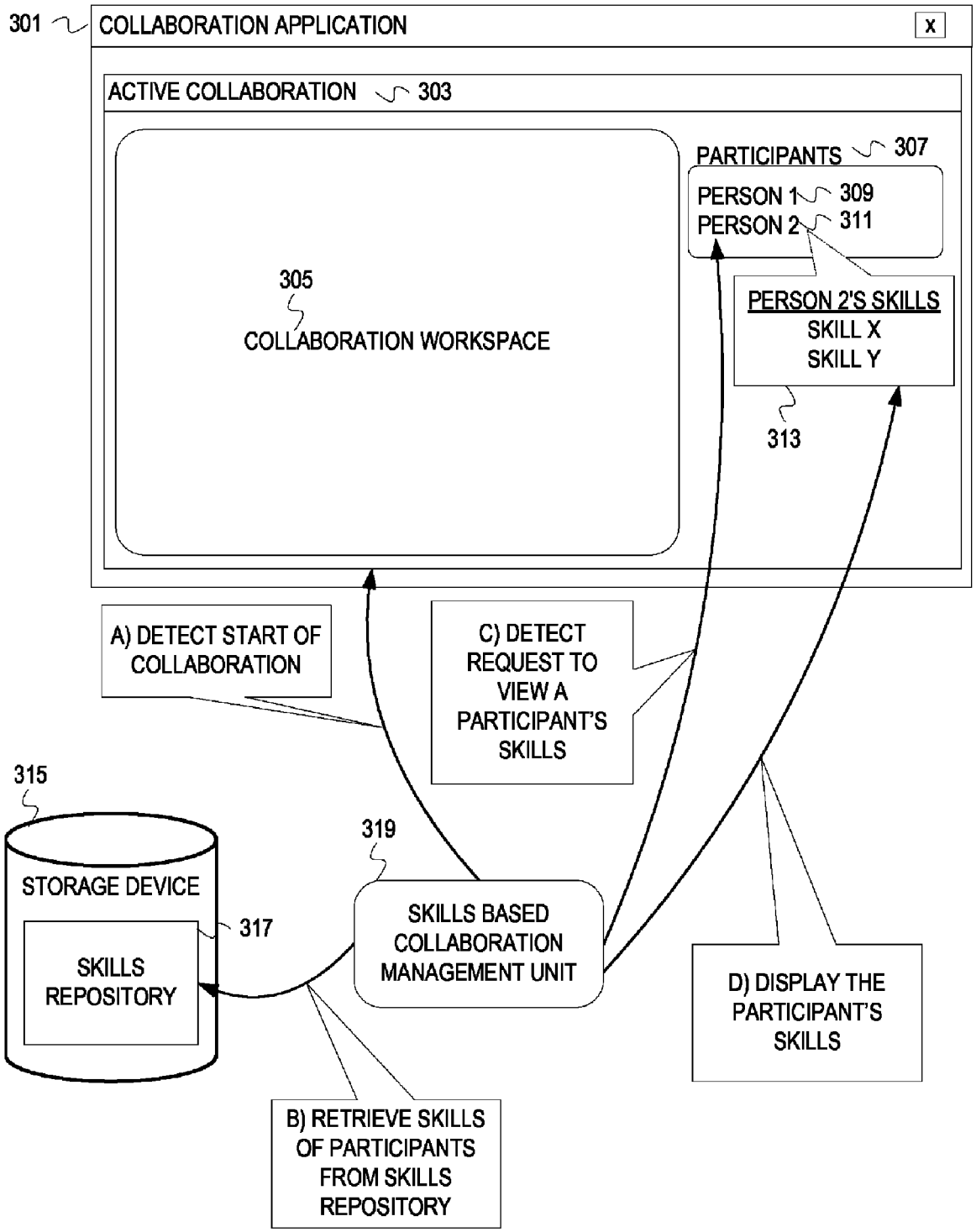
FIG. 3 is an example conceptual diagram of displaying a participant's skills in an online collaboration.

FIG. 3 is an example conceptual diagram of displaying a participant's skills in an online collaboration. An active collaboration window 303 is active in a collaboration application 101. The active collaboration window 303 comprises a meeting workspace 305 and a participants area 307. Two participants are shown in the participants area 307 person 1 309 and person 2 311.

At stage A, a skills based collaboration management unit 319 detects start of an online collaboration in the active collaboration window 303. Examples of detecting start of an online collaboration include detecting that a moderator has opened the meeting, detecting that a collaboration start time is reached, etc.

At stage B, the skills based collaboration management unit 319 retrieves skills of the participants, person 1 309 and person 2 311, from a skills repository. Although the skills repository is depicted singularly, more than one skill of the participants may be retrieved from more than one skills repository.

At stage C, the skills based collaboration management unit 319 detects a request to view a participant's skills. Examples of detecting a request to view a participant's skills include detecting a click on a button, detecting a click on a participants name, detecting that a participant is speaking, a mouse over event, etc. In this example, the skills based collaboration management unit 319 detects a click on person 2 311 in the participants area 307.

At stage D, the skills based collaboration management unit 319 displays the participant's skills. A participant's skills may be displayed in a bubble, a dialog box, etc. In this example, the skills of person 2 311 are displayed in a bubble 313.

Figure 4:
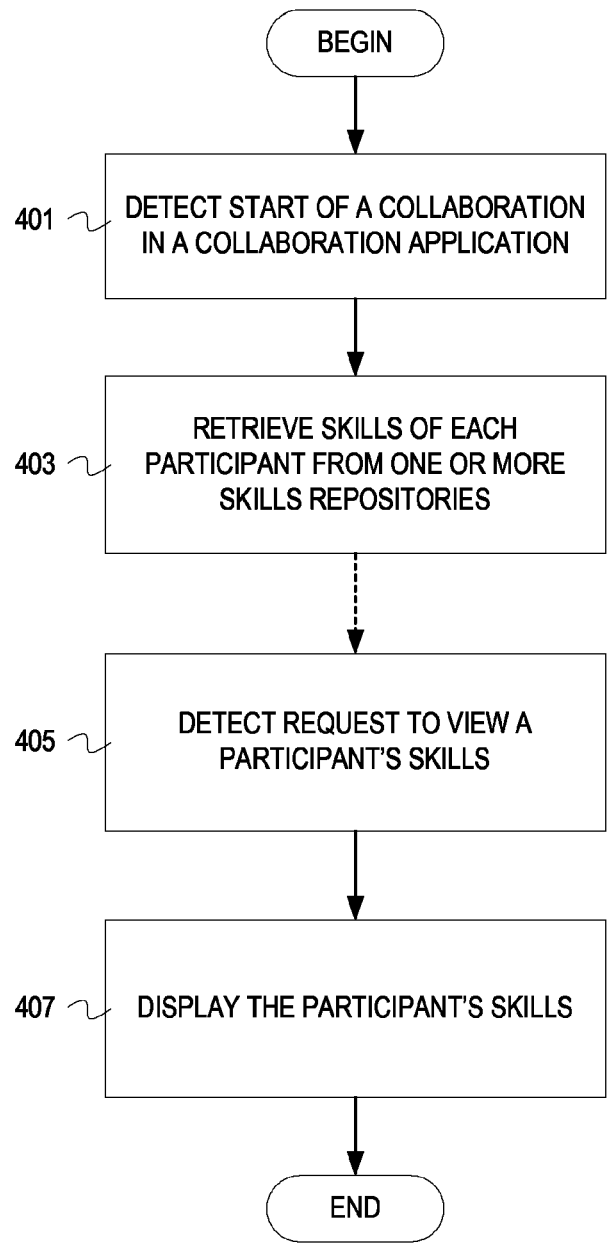
FIG. 4 is a flowchart depicting example operations for displaying participants' skills in an online collaboration.

FIG. 4 is a flowchart depicting example operations for displaying participants' skills in an online collaboration. Flow begins at block 401, where start of an online collaboration is detected in a collaboration application. For example, a moderator initiates the online collaboration.

At block 403, skills of each participant are retrieved from one or more skills repositories. Retrieving the skills of each participant comprises storing the retrieved skills in a local store to the online collaboration application and storing the skills at one or more clients of the participants. The participants' skills may be retrieved in batch once all participants have joined the meeting or individually as participants join the meeting. In addition, the participants' skills may have been cached along with information about the meeting (e.g., date, time, etc.) by the collaboration application when invitations for the online collaboration were sent. The online collaboration application can retrieve the cached copies instead of accessing the skills repositories. The dashed line represents flow from block 403 to block 405. Block 405 occurs after receiving input.

At block 405, a request to view a participant's skills is detected. For example, voice recognition functionality of the collaboration application detects that the participant begins talking.

At block 407, the participant's skills are displayed. For example, a dialog box containing the participant's skills hovers below a participant area in the online collaboration. In addition to displaying participants' skills during an online collaboration, participants' skills may be included in an invitation so that participants can become more familiar with each other before the online collaboration starts.

Figure 5:
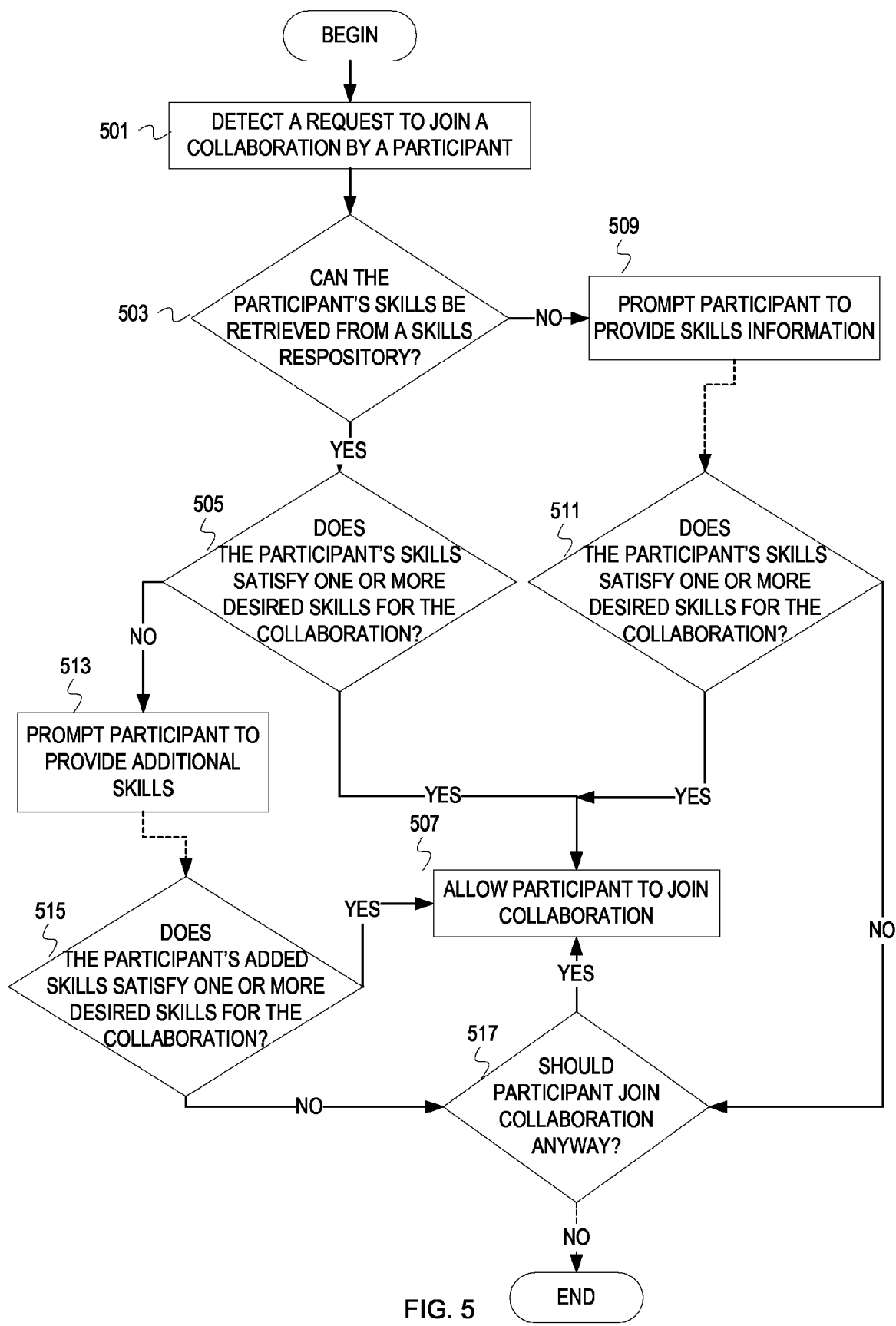
FIG. 5 is a flowchart depicting example operations for analyzing a participant's skill set to determine if the participant will provide value to an online collaboration.

Participants' skills information can be used to promote efficiency of online collaborations by analyzing participant's skills as they join online collaborations. FIG. 5 is a flowchart depicting example operations for analyzing a participant's skill set to determine if the participant will provide value to an online collaboration. Flow begins at block 501, where a request to join an online collaboration by a participant is detected. Examples of detecting a request to join an online collaboration include detecting a click on a link, a click on a button, execution of a script to automatically join the online collaboration, etc.

At block 503, it is determined if the participant's skills can be retrieved from a skills repository. Sometimes the participant's skills cannot be retrieved from a skills repository. For example, the participant's skills are not in a company skills repository because the participant may be an independent contractor. As another example, a new employee may not have completed a skills assessment for the skills repository. If the participant's skills can be retrieved from a skills repository, flow continues at block 505. If the participant's skills cannot be retrieved from a skills repository, flow continues at block 509.

At block 505, it is determined if the participant's skills satisfy one or more of the desired skills for the online collaboration. If the participant's skills satisfy one or more of the desired skills for the online collaboration, flow continues at block 507. If the participant's skills do not satisfy one or more of the desires skills for the online collaboration, flow continues at block 513.

At block 507, the participant is allowed to join the online collaboration.

If the participant's skill could not be retrieved at block 503, then at block 509, the participant is prompted to provide skills information. Since the participant's skills were not found in one of the skills repositories, the participant is given the opportunity to provide information about his or her skills so that the participant's skills can be viewed in the online collaboration. The skills information is also used to determine if the participant can provide value to the online collaboration. The dashed line represents flow from block 509 to block 511. Block 511 occurs after receiving input from the participant.

At block 511, it is determined if the participant's skills satisfy one or more of the desired skills for the online collaboration. If the participant's skills satisfy one or more of the desired skills for the online collaboration, flow continues at block 507. If the participant's skills do not satisfy one or more of the desires skills for the online collaboration, flow continues at block 517.

At block 513, the participant is prompted to provide additional skills. The additional skills are used to determine if the participant can provide value to the online collaboration. The dashed line represents flow from block 513 to block 515. Block 515 occurs after receiving input from the participant.

At block 515, it is determined if the participant's added skills satisfy one or more of the desired skills for the online collaboration. If the participant's added skills satisfy one or more of the desired skills for the online collaboration, flow continues at block 507. If the participant's skills do not satisfy one or more of the desired skills for the online collaboration, flow continues at block 517.

At block 517, it is determined if the participant should join the online collaboration even though his or her skills do not match the skills desired for the online collaboration. Determining if the participant should join the meeting may be based on a manual indication from a participant. For example, a collaboration application notifies a participant that his or her skills do not match the desired skills and asks if he or she would like to join the meeting anyway. Notifying participants that do not possess skills desired for active participation in an online collaboration increases meeting efficiency because participant's who are unlikely to provide value to an online collaboration may not join. When a participant does not have the desired skills, time may be wasted answering the participant's questions when the participant cannot provide useful information. However, a participant may wish to join an online collaboration even though he or she does not possess the desired skills. For example, a manager may wish to join the meeting to oversee a problem solving process or be a mediator. Detecting if the participant should enter the online collaboration may be automatic based on indicated preferences. For example, employees with rank above a certain minimum rank should automatically be allowed to enter an online collaboration when their skills do not match the desired skills and employees below the certain rank should not be allowed to join the online collaboration. As another example, preferences may indicate names of participants who should be allowed to enter the meeting even if their skills do not match indicated skills. If the participant should join the online collaboration, flow continues at block 517. If the participant should not join the online collaboration, the participant is not allowed to join the online collaboration and flow ends.

Although the operations depicted in FIG. 5 are performed when a meeting is started, the operations may instead be performed when a participant receives and/or accepts an invitation.

Meeting participants may be prompted to provide information about their skills so that their skills can be displayed in an online collaboration. Skills that are not retrieved from a skills database may be displayed in another color to differentiate them. In addition to skills information, other profile information may be displayed in an online collaboration including work history, current projects, department, etc. Access control and filtering may also be applied so that skills information is shared with a select group of participants. For example, some skills or profile information should not be viewed by participants external to a company.

Although the examples refer to databases, embodiments are not so limited. For example, the skills repository can be a directory (e.g., X.500 directory, lightweight directory access protocol (LDAP) directory, etc.). In addition, the repository may be accessed via a Web service protocol such as Simple Object Access Protocol (SOAP).

The collaboration application can be further enhanced to control the communications during collaboration, to restrict active participation to participants possessing minimum levels of one or more skills during certain times. Restricting active participation to knowledgeable participants may lead to more focused and productive communications.

It should be understood that the depicted flowcharts are examples meant to aid in understanding embodiments and should not be used to limit embodiments or limit scope of the claims. Embodiments may perform additional operations, fewer operations, operations in a different order, operations in parallel, and some operations differently.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing ("storage medium") or transmitting ("signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied as a machine-readable signal medium, examples of which include an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
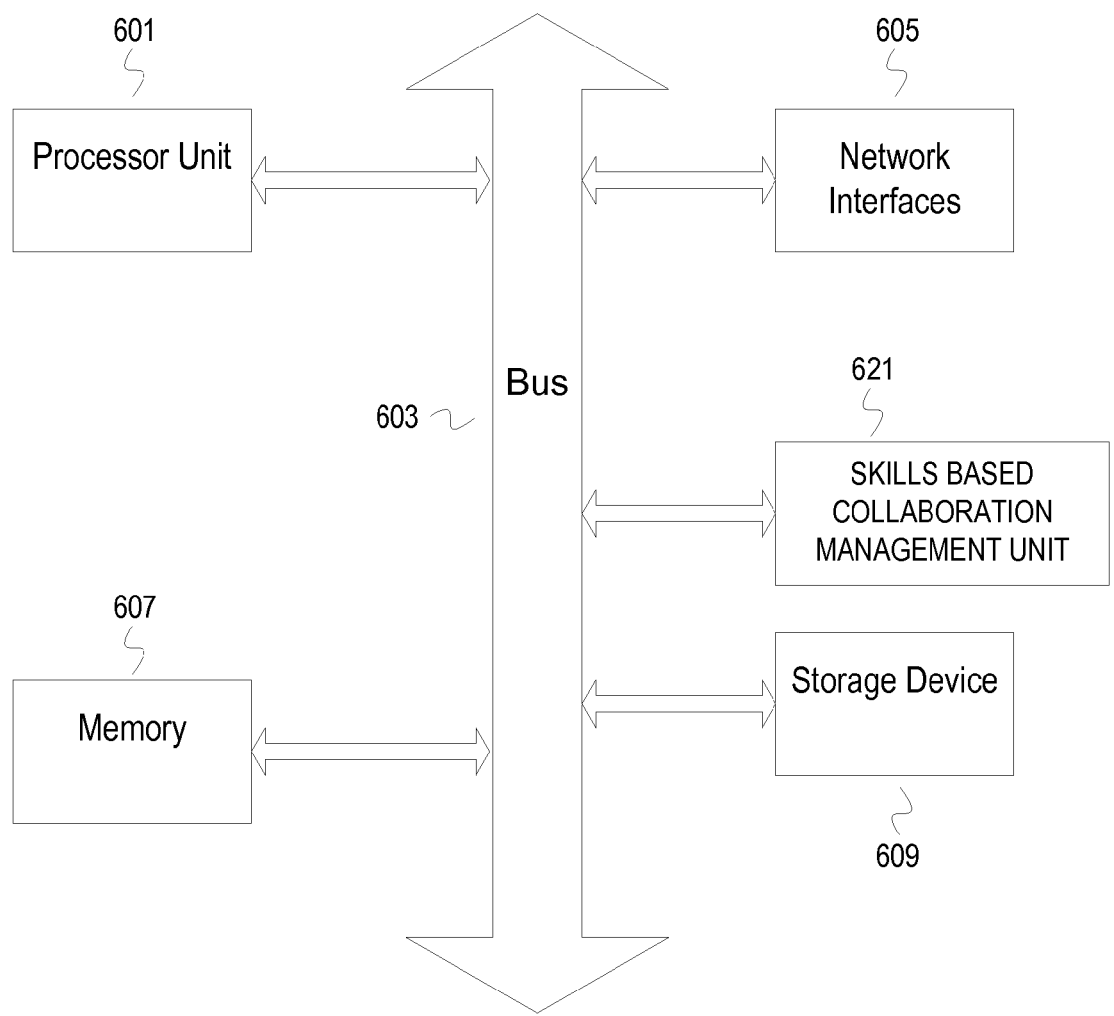
FIG. 6 depicts an example computer system.

FIG. 6 depicts an example computer system. A computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The computer system also includes a skills based collaboration management unit 621 that searches for potential participants for an online collaboration based on indicated skills, automatically invites one or more potential participants to the online collaboration and displays the one or more participants' skills in the online collaboration. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. In general, techniques for integrating participant profile information into real-time collaborations as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    detecting a request for potential participants for an online collaboration based on one or more indicated skills;
    searching one or more skills repositories for potential participants that have the one or more indicated skills, wherein the searching yields a plurality of potential participants;
    selecting one or more of the plurality of potential participants;
    automatically inviting the selected one or more potential participants to participate in the online collaboration;
    allowing a user who does not possess the one or more indicated skills to join the online collaboration;
    detecting a request for a second user to join the online collaboration;
    determining that the one or more skills repositories does not indicate that the second user possesses at least one of the one or more indicated skills;
    prompting the second user to provide skill information;
    determining that the skill information provided by the second user includes at least one of the one or more indicated skills;
    allowing the second user to join the online collaboration; and
    graphically depicting the at least one of the one or more indicated skills of the second user differently than the one or more indicated skills of those of the selected one or more potential participants who have joined the online collaboration, wherein the at least one skill of the second user is depicted differently based, at least in part, on the second user providing the skill information; and
    restricting the user who does not possess the one or more indicated skills from actively participating in the online collaboration while allowing active participation in the online collaboration by those of the selected one or more potential participants who join the online collaboration.

2. The method of claim 1, wherein the one or more skills repositories comprise at least one of a database and a directory.

3. The method of claim 1, wherein said selecting the one or more potential participants from the plurality of potential participants is based, at least in part, on one or more of manual indication by a moderator of the online collaboration and automatic selection according to one or more preferences.

4. The method of claim 1, wherein said selecting the one or more potential participants from the plurality of potential participants further comprises displaying the plurality of potential participants.

5. The method of claim 1 further comprising displaying skills of the selected one or more potential participants in one or more of the online collaboration and invitations, wherein said inviting the selected one or more potential participants to participate in the online collaboration comprises electronically sending the invitations to the selected one or more potential participants.

6. The method of claim 5 further comprising retrieving skills of the selected one or more potential participants from the one or more skills repositories.

7. A computer implemented method comprising:
   detecting start of an online collaboration;
   retrieving a skill of a first participant of the online collaboration from one or more skills repositories;
   automatically displaying the retrieved skill of the first participant in response to indication of the first participant in a user interface of a collaboration application coordinating the online collaboration;
   receiving skill information of a second participant responsive to prompting the second participant;
   determining that the skill information of the second participant indicates a skill in a plurality of skills indicated for the online collaboration;
   displaying, in the user interface of the collaboration application, the skill of the second participant differently than the skill of the first participant to indicate that the skill of the second participant was entered by the second participant instead of retrieved from the one or more skills repositories; and
   restricting a third participant, who has joined the online collaboration, from actively participating in the online collaboration based on the third participant not possessing at least one of the plurality of skills indicated for the online collaboration.

8. The method of claim 7, wherein said retrieving the skill of the first participant of the online collaboration from one or more skills repositories comprises storing the retrieved skill in a store local to the online collaboration application and storing the skill at one or more clients of the second and third participants.

9. The method of claim 7, wherein the indication comprises one of a mouse over event that corresponds to a graphical representation of the first participant, a manual selection of a graphical representation of the first participant, and automatic selection of a graphical representation of the first participant.

10. A computer program product for integrating participant profile information into real-time collaborations, the computer program product comprising:
   a computer usable storage device having computer usable program code embodied therewith, the computer usable program code comprising:
   computer usable program code configured to:
      detect a request for potential participants for an online collaboration based on one or more indicated skills;
      search one or more skills repositories for potential participants that have the one or more indicated skills, wherein the searching yields a plurality of potential participants;
      select one or more of the plurality of potential participants;
      invite the selected one or more potential participants to participate in the online collaboration;
      allow a user who does not possess the one or more indicated skills to join the online collaboration;
      detect a request for a second user to join the online collaboration;
      determine that the one or more skills repositories does not indicate that the second user possesses at least one of the one or more indicated skills;
      prompt the second user to provide skill information;
      determine that the skill information provided by the second user includes at least one of the one or more indicated skills;
      allow the second user to join the online collaboration; and
      graphically depict the at least one of the one or more indicated skills of the second user differently than the one or more indicated skills of those of the selected one or more potential participants who have joined the online collaboration, wherein the at least one skill of the second user is depicted differently based, at least in part, on the second user providing the skill information; and
      restrict the user who does not possess the one or more indicated skills from actively participating in the online collaboration while active participation in the online collaboration by those of the selected one or more potential participants who join the online collaboration is allowed.

11. The computer program product of claim 10, wherein the one or more skills repositories comprise at least one of a database and a directory.

12. The computer program product of claim 10, wherein the said one or more skills repositories comprise one or more database structures stored on one or more storage devices.

13. The computer program product of claim 10, wherein said computer usable program code being configured to select the one or more potential participants from the plurality of potential participants is based, at least in part, on one or more of manual indication by a moderator of the online collaboration and automatic selection according to one or more preferences.

14. The computer program product of claim 10, wherein said computer usable program code being configured to select the one or more potential participants from the plurality of potential participants comprises the computer usable code being configured to display the plurality of potential participants.

15. The computer program product of claim 10, wherein said computer usable program code is further configured to display skills of the selected one or more potential participants in one or more of the online collaboration and invitations, wherein said computer usable program code is further configured to invite the selected one or more potential participants to participate in the online collaboration comprises the computer usable code being configured to electronically send the invitations to the selected one or more potential participants.

16. The computer program product of claim 15, wherein said computer usable program code is further configured to retrieve skills of the selected one or more potential participants from the one or more skills repositories.

17. An apparatus comprising:
   a set of one or more processing units;
   a network interface; and
   one or more machine-readable media having stored therein program instructions that embody a skills based collaboration management unit,
   the skills based collaboration management unit configured to,
      detect a request for potential participants for an online collaboration based on one or more indicated skills;
      search one or more skills repositories for potential participants that have the one or more indicated skills, wherein the searching yields a plurality of potential participants;
      select one or more of the plurality of potential participants; and
      invite the selected one or more potential participants to participate in the online collaboration;
      allow a user who does not possess the one or more indicated skills to join the online collaboration;
      detect a request for a second user to join the online collaboration;

determine that the one or more skills repositories does not indicate that the second user possesses at least one of the one or more indicated skills;
prompt the second user to provide skill information;
determine that the skill information provided by the second user includes at least one of the one or more indicated skills;
allow the second user to join the online collaboration; and
graphically depict the at least one of the one or more indicated skills of the second user differently than the one or more indicated skills of those of the selected one or more potential participants who have joined the online collaboration, wherein the at least one skill of the second user is depicted differently based, at least in part, on the second user providing the skill information; and
restrict the user who does not possess the one or more indicated skills from actively participating in the online collaboration while active participation in the online collaboration by those of the selected one or more potential participants who join the online collaboration is allowed.

* * * * *